UNITED STATES PATENT OFFICE 2,447,583

PREPARATION OF CYCLIC OXIMES

Theodoor Koch, Oosterbeek, Netherlands, assignor to American Enka Corporation, Enka, N. C., a corporation of Delaware No Drawing. Application December 17, 1946, Serial No. 716,877. In the Netherlands March 5, 1946

10 Claims. (Cl. 260—566)

This invention relates to the preparation of cyclic oximes from cyclic ketones having at least four ring carbon atoms. More particularly, the invention relates to methods for the preparation of oximes having the structural formula:

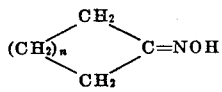

from the corresponding ketones having the structural formula:

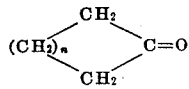

where $n$ is an integer varying from 1 to 7.

One of the principal objects of the present invention is to provide a method for synthesizing a cyclic oxime having at least four ring carbon atoms from the corresponding cyclic ketone. A further object of the invention is to provide a method for preparing a cyclic oxime from a cyclic ketone having from 4 to 10 ring carbon atoms, while avoiding the necessity for conducting difficult steps of intensive purification upon the cyclic ketonic starting material. A still further object of the invention is to provide a method for preparing a cyclic oxime from a cyclic ketone having from 4 to 10 ring carbon atoms without the necessity for employing hydroxylamine or derivatives thereof such as hydroxylamine salts, these being difficult and expensive to prepare in the necessary pure form.

The manner in which these and other objects and features of the invention are attained will appear more fully from the following description thereof, in which reference is made to typical and preferred procedures in order to indicate more fully the nature of the invention, but without intending in any way to limit the scope of the invention thereby.

It has already been proposed to prepare cyclic oximes from cyclic ketones by the action of hydroxylamine, or salts thereof, on the cyclic ketones. This method is difficult to apply in practice, especially on any substantial scale, in view of the fact that difficult and costly operations are necessary for obtaining the hydroxylamine, or salts thereof, in a relatively pure state. Moreover, it is by no means an easy matter to prepare sufficiently pure cyclic ketones by fractional distillation so that the oximes derived therefrom can be employed without further purification as a basic starting material for the production of synthetic polycondensates. Under such circumstances a further purification of the oximes, such as by fractional distillation, would be necessary, but such a purification procedure is not without danger since, due to the somewhat unstable constitution of the oximes, there is always the possibility that unexpected and disastrous explosions may occur. For example, cyclohexanone is technically prepared by the pyrogenic dehydrogenation of cyclohexanol; however, the purification of cyclohexanone by fractional distillation gives rise to many difficulties on account of the presence of by-products formed during the reaction, and it is not generally possible to obtain in this manner a yield of ketone better than 87–88%. In order to obtain a substantially pure cyclic ketone product, it is therefore desirable to make use of the known method wherein the cyclic ketone is first converted into its bisulfite addition compound and in that form is subsequently separated from associated impurities.

According to the present invention, it has been found that the preparation of very pure oximes from cyclic ketones having from 4 to 10 ring carbon atoms can be greatly simplified, and can be accomplished without the use of hydroxylamine and its derivatives in a desirable manner by the following procedure: The above-mentioned bisulfite addition compound of the cyclic ketone is not first decomposed, but instead is substantially immediately converted to the desired cyclic oxime by reaction with an alkali metal nitrite, such as sodium or potassium nitrite, or a nitrous-acid-producing compound, either with or without the addition of extra bisulfite or $SO_2$.

Taking the formation of the $C_6$ cyclic oxime from the bisulfite addition compound of the cyclic ketone, cyclohexanone, by way of example, the reaction proceeds as follows:

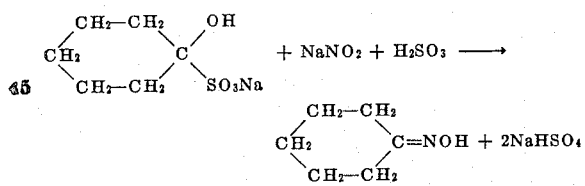

This reaction proceeds advantageously at substantially lowered temperatures, preferably at temperatures below 0° C., since under these conditions substantially no development of nitrous vapors or formation of ammonium compounds occurs, the formation of such compounds being undesirable from the viewpoint of high yields of the desired oxime.

The preparation of the bisulfite addition compounds of the cyclic ketones, most of which are difficultly soluble in water, can be carried out advantageously in the following manner:

The appropriate cyclic ketone, or mixture containing the cyclic ketone, is mixed in water while stirring with the addition of $SO_2$. The cyclic ketone is thereby dissolved. Thereupon $Na_2SO_3$ such as in the form of an aqueous solution is added, whereupon the cyclic ketone bisulfite addition compound separates out in such a condition that it can be very easily filtered. It should be noted at this point that when treating the cyclic ketone, or mixture containing the cyclic ketone, directly with a sodium sulfite solution, a very fine crystalline conglomerate is obtained, which can only be filtered with considerable difficulty; accordingly, it is particularly desirable to form the cyclic ketone bisulfite addition compounds in the manner just described.

In order to indicate still more fully the nature of the present invention, the following example of typical procedure is set forth, it being understood that this example is presented as illustrative only, and that it is not intended to limit the scope of the invention.

Example

One kg. of technical cyclohexanone (87% ketone) is intensively stirred in 3 liters of water and $SO_2$-gas is introduced into the mixture until a substantially homogeneous mixture is obtained. A saturated solution of $Na_2SO_3$ is then added to the mixture, immediately resulting in the formation of a coarse crystalline mass. The introduction of sodium sulfite solution is continued until no further precipitation is apparent.

The crystalline mass comprising the cyclohexanone-bisulfite addition compound (sodium salt) is filtered and washed with cold water, followed by alcohol, until all soluble matter has been removed.

Of the pure cyclohexanone-bisulfite addition compound thus obtained, 202 g. (1 mol) are stirred in a vessel fitted with a high speed stirring device with about 1½ liters of water while cooling to −5° C. Then while stirring continuously, a solution of 83 g. (1.2 mols) of sodium nitrite in 100 g. of water is added dropwise at such a rate that the temperature of the reaction mass does not rise above 0° C.

A slight amount of $SO_2$ gas is then introduced until the reaction mass is just acid to litmus. The reaction is completed in about two to three hours.

The cooling is discontinued, the reaction mixture is neutralized with a sodium carbonate solution, using methyl orange as indicator, and is then heated by the introduction of steam, until the already-forming oxime starts to melt, after which the intensive stirring is continued for another 15 minutes.

After cooling, the cyclohexanone oxime may be isolated by filtration and washed with cold water. This cyclohexanone oxime is sufficiently pure to serve as a basic starting material for the preparation of ε-caprolactam without the necessity for further distillation.

The yield, based on the cyclohexanone-bisulfite addition compound, is 90–93%.

While the specific example set forth above describes in detail the preparation of the six-carbon-atom oxime corresponding to, and derived from, cyclohexanone, the procedure is also applicable in a similar manner to the preparation of the homologous derivatives corresponding to the lower and higher cycloalkanones, such as cyclobutanone, cyclopentanone, cycloheptanone, cyclo-octanone, cyclononanone and cyclodecanone, as well as to the lower-alkyl nuclear substitution products thereof, such as methyl and ethyl cyclohexanone. Generally speaking, therefore, the present invention in its broader aspects is applicable to the preparation of compounds corresponding to the structural formula:

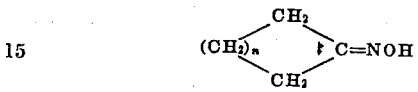

where $n$ is an integer varying from 1 to 7, and the nuclear lower-alkyl substitution products thereof in which there is at least one nuclear alkyl substituent of not more than three carbon atoms.

The cycloalkanone oximes prepared in the manner described may be readily converted into the corresponding lactams without the necessity for further purification.

While various specific examples of preferred compositions and methods embodying the present invention have been described above, it will be apparent that many changes and modifications may be made in the methods of procedure, and that a wide variety of specific reagents may be employed in carrying out the procedure. It should therefore be understood that the example cited and the particular proportions and methods of procedure set forth above are intended to be illustrative only, and are not intended to limit the scope of the invention.

What is claimed is:

1. A method for the preparation of a cycloalkanone oxime having from 4 to 10 ring carbon atoms from the corresponding cyclic ketone, comprising reacting the cyclic ketone with a compound yielding a sulfite radical under the reaction conditions and thereby producing the corresponding bisulfite addition compound, and thereafter reacting the latter with a compound selected from the class consisting of nitrous acid and alkali metal salts thereof.

2. A method for the preparation of a cycloalkanone oxime having from 4 to 10 ring carbon atoms from the corresponding cyclic ketone, comprising reacting a mixture of the cyclic ketone and water with an excess of sulphurous acid and then with an alkali metal sulfite, thereby obtaining the corresponding cyclic ketone-bisulfite addition compound in a coarse crystalline form, and thereafter reacting the thus-produced cyclic ketone-bisulfite addition compound with a compound selected from the class consisting of nitrous acid and alkali metal salts thereof.

3. A method for the preparation of cyclohexanone oxime from cyclohexanone, comprising reacting the cyclohexanone with a compound yielding a sulfite radical under the reaction conditions and thereby producing the corresponding bisulfite addition compound, and thereafter reacting the latter with a compound selected from the class consisting of nitrous acid and alkali metal salts thereof.

4. A method for the preparation of cyclohexanone oxime from cyclohexanone, comprising reacting a mixture of the cyclohexanone and water with an excess of sulphurous acid and then with an alkali metal sulfite, thereby obtaining the corresponding cyclohexanone-bisulfite addition compound in a coarse crystalline form, and thereafter reacting the thus-produced cyclohexanone-bisulfite addition compound with a compound selected from the class consisting of nitrous acid and alkali metal salts thereof.

5. A method as in claim 1 wherein the bisulfite addition compound is reacted with sodium nitrite.

6. A method as in claim 2 wherein the alkali metal sulfite is sodium sulfite, and wherein the bisulfite addition compound is reacted with sodium nitrite.

7. A method as in claim 3 wherein the bisulfite addition compound is reacted with sodium nitrite.

8. A method as in claim 4 wherein the alkali metal sulfite is sodium sulfite, and wherein the bisulfite addition compound is reacted with sodium nitrite.

9. A method for the preparation of a cycloalkanone oxime having from 4 to 10 ring carbon atoms comprising reacting a cycloalkanone-bisulfite addition compound with a compound selected from the class consisting of nitrous acid and alkali metal salts thereof.

10. A method for the preparation of cyclohexanone oxime comprising reacting a cyclohexanone-bisulfite addition compound with sodium nitrite.

THEODOOR KOCH.

REFERENCES CITED

The following references are of record in the file of this patent:

Eck et al., "Organic Syntheses," vol. 19 (1939), pp. 20 to 21.